(12) United States Patent
Azenkot

(10) Patent No.: US 10,498,579 B1
(45) Date of Patent: Dec. 3, 2019

(54) DYNAMIC CONSTELLATION ADAPTATION FOR SLICER

(71) Applicant: MACOM Technology Solutions Holding, Inc., Lowell, MA (US)

(72) Inventor: Yehuda Azenkot, San Jose, CA (US)

(73) Assignee: MACOM TECHNOLOGY SOLUTIONS HOLDING, INC., San Jose, CA (US)

( * ) Notice: Subject to any disclaimer, the term of this patent is extended or adjusted under 35 U.S.C. 154(b) by 0 days.

(21) Appl. No.: 15/984,117

(22) Filed: May 18, 2018

(51) Int. Cl.
| | |
|---|---|
| *H03H 7/30* | (2006.01) |
| *H04L 27/38* | (2006.01) |
| *H04L 25/03* | (2006.01) |
| *H04L 27/34* | (2006.01) |

(52) U.S. Cl.
CPC .... *H04L 27/3881* (2013.01); *H04L 25/03019* (2013.01); *H04L 27/3405* (2013.01); *H04L 2025/0342* (2013.01)

(58) Field of Classification Search
CPC ........... H04L 27/3881; H04L 25/03019; H04L 27/3405; H04L 2025/0342
USPC ........................................................ 375/232
See application file for complete search history.

(56) References Cited

U.S. PATENT DOCUMENTS

| | | | | |
|---|---|---|---|---|
| 4,247,944 A | * | 1/1981 | Sifford | H04L 27/38 341/102 |
| 5,831,561 A | * | 11/1998 | Cai | H04L 25/4927 341/106 |
| 6,584,151 B1 | * | 6/2003 | Dehghan | H04L 25/03006 375/232 |

FOREIGN PATENT DOCUMENTS

WO     WO-9810554 A2 * 3/1998 ........... H04L 5/0007

\* cited by examiner

*Primary Examiner* — Helene E Tayong

(57) ABSTRACT

System and method of demodulation by adapting constellation values based on statistic distributions of received data symbols. To determine an adapted constellation, an expected ratio of received symbols with values in a certain range is preset based on an expected statistic distribution of data symbols across the multiple constellations. For a set of received symbols, a count ratio of symbols falling in a first range to all the symbols in the set is compared with the expected ratio, where the first range is defined as below a first value. The first value is repeatedly adjusted to adjust the first range until the count ratio equals the expected ratio. The final first value is then designated as the optimal adapted constellation.

19 Claims, 10 Drawing Sheets

DYNAMIC CONSTELLATION ADAPTATION FOR SLICER

TECHNICAL FIELD

The present disclosure relates generally to the field of signal processing in communication systems, and, more specifically, to the field of demodulation mechanisms in receivers.

BACKGROUND OF THE INVENTION

Multi-level Pulse Amplitude Modulation (PAM) has become a favored modulation mechanism in signal transmission, whether between chips on a Printed Circuit Board (PCB) or from one end of a long-haul optical fiber to another. On the transmitter side, the amplitudes of carrier pulses are varied according to the sample value of the message signal and based on the constellation levels of the particular PAM-N scheme. Correspondingly, on the receiver side, demodulation is performed based on the constellation levels by detecting the amplitude level of the carrier at every period.

As a signal transmitted from a transmitter to a receiver, a wide range of factors in the communication channel can cause the shape and amplitude of the signal to be altered, also called non-linearity, such as due to noise and phase interference. When characterized by using eye diagrams, non-linearity or amplitude compression can alter the eye height of different transition eyes, leading to errors due to a lower Signal-Noise-Ratio (SNR).

At the receiver side, when a noise-affected signal is converted to a digital signal and subject to demodulation, it is likely mapped to a constellation point that does not correspond identically to a signal constellation level. A slicer is used to determine which signal constellation level lies closest to the received symbol based on a set of thresholds which are typically defined to be evenly spaced. Unfortunately, non-linearity likely causes a received symbol to move closer to another constellation level than the one transmitted. Hence incorrect modulation tends to occur as the nominal thresholds used in the slicer do not factor in non-linearity. In the existing art, various computationally intensive calculations have been developed for identifying the actual closest signal constellation level. These calculations consume a significant amount of the valuable computation resources in a receiver.

SUMMARY OF THE INVENTION

Embodiments of the present disclosure provide cost-effective mechanisms of dynamically adapting the constellation selection thresholds and the constellation levels to signal nonlinearity distortions for a slicer and thereby facilitating accurate data recovery during demodulation at a receiver.

Embodiments of the present disclosure use threshold adaptation logic to dynamically adapt the thresholds of a slicer to nonlinearity or other distortions in the received signals based on statistic distributions of the data symbols. In some embodiments, the slicer is configured for an N-level Pulsed Amplitude Modulation (PAM-N) scheme which uses N−1 thresholds to map received symbols to N constellations. Collectively speaking, the data symbols as modulated and transmitted are distributed across the N nominal constellations substantially in certain known percentages or ratios. Typically, when they are transmitted, a large number of symbols are distributed substantially evenly across the N nominal constellations. Therefore, at the slicer of the receiver, the inputs in a particular range that is defined by an optimal adapted threshold (e.g., below the specific threshold) is expected to constitute a corresponding certain ratio (the expected ratio) of the total inputs regardless of the signal nonlinearity. To discover this optimal adapted threshold that offsets from the nominal threshold, the threshold adaption logic (1) identifies a first value which causes the slicer inputs that fall in a first range to constitute a first ratio of the total slicer inputs, where the first ratio is the expected ratio minus an error ratio that is substantially smaller than the expected ratio; and (2) identifies a second value which causes the slicer inputs in a second range to constitute a second ratio of the total slicer inputs, where the second ratio is the expected ratio plus the same error ratio. The adapted threshold is then derived based on the first and the second values. In some embodiments, the threshold adaptation logic uses a comparator to compare the slicer inputs with the first or second value and accordingly uses a counter to keep count of slicer inputs that falls below the first or second value (the first or second range). A ratio of the inputs in the first or second range to the total inputs can thus be calculated based on the count. The first or second value is adjusted until the first or second ratio is reached. The final first or second value is then used to calculate the optimal adapted threshold in a simple arithmetic operation.

In accordance with embodiments of the present disclosure, a set of thresholds of a slicer can be dynamically determined and adapted to signal non-linearity and amplitude compression in a statistical approach. As a result, data demodulation and data recovery at the receiver can be advantageously performed with significantly reduced error rates. The threshold adaptation process does not involve complicated processing or computationally intensive calculations and can be implemented by using simple circuitry, e.g., including a comparator and counters. Thus, compared with the conventional approaches, the present disclosure offers reduced design and development costs as well as operational power consumption.

According to another aspect of the present disclosure, constellation adaptation logic is used to dynamically adapt the values of constellations to signal nonlinearity and other distortions at a slicer based on statistic distributions of the data symbols. In some embodiments, to discover an optimal adapted constellation which offsets from a nominal constellation, the constellation adaption logic compares a first value with a set of slicer inputs and keeps count of the slicer inputs that fall in a certain range defined by the first value (e.g., below the first value) based on the comparison results. The count ratio of the number of inputs in the certain range (e.g., lower than the first value) to the number of the set of inputs is also derived. The first value is adjusted until the count ratio reaches an expected ratio associated with the nominal constellation. The first value is then designated as the adapted constellation to be used by the slicer.

According to embodiments of the present disclosure, constellation levels of a slicer can be dynamically determined and adapted to signal non-linearity and amplitude compression in a statistical approach. As a result, data demodulation and data recovery can be advantageously performed with further reduced error rates at the receiver. Similarly, the constellation adaptation does not involve computationally intensive calculations or complicated circuitry design. Thus, design and development costs and operational power consumption can be advantageously further reduced, compared with the conventional approaches.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

BRIEF DESCRIPTION OF THE DRAWINGS

Embodiments of the present invention will be better understood from a reading of the following detailed description, taken in conjunction with the accompanying drawing figures in which like reference characters designate like elements.

DYNAMIC CONSTELLATION ADAPTATION FOR SLICER

Figure 1:
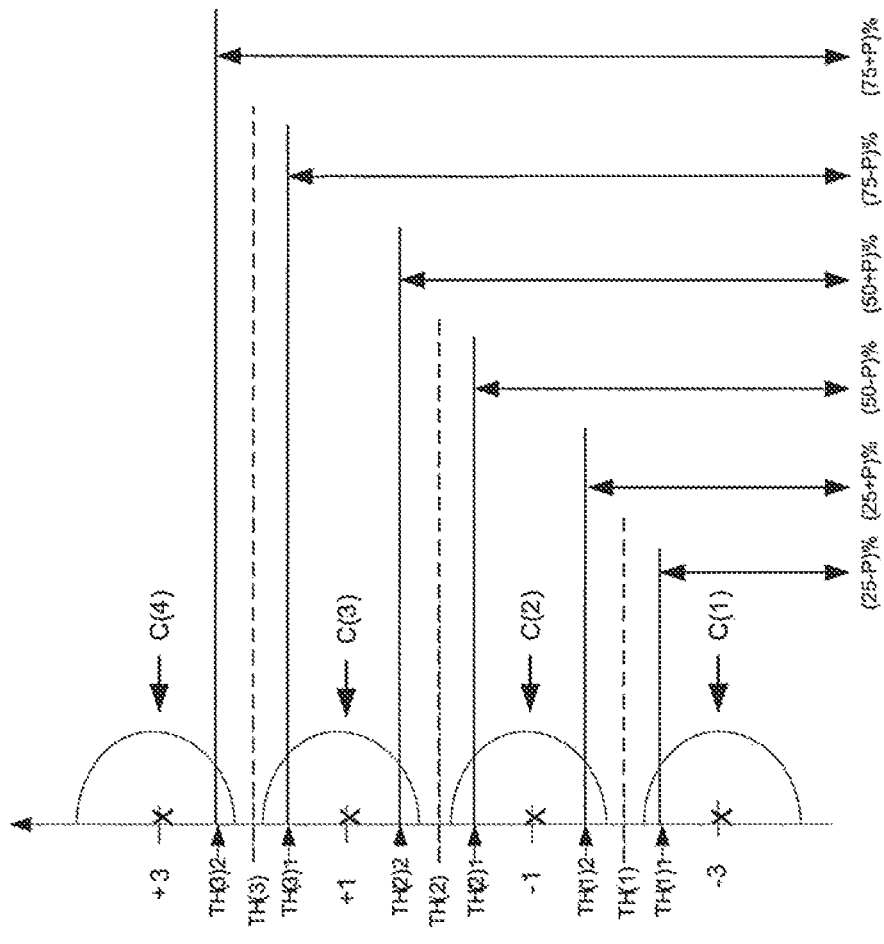
FIG. 1 illustrates exemplary data ranges used to determine optimal adapted thresholds of constellation selection based on an expected statistic distribution of data symbols across multiple constellations in accordance with an embodiment of the present disclosure.

Embodiments of the present disclosure provide a threshold adaptation mechanism of determining optimal adapted thresholds for constellation selection by a slicer at a receiver based on statistic distributions of the data symbols across multiple constellations in a modulation scheme. More specifically, to determine an optimal adapted threshold, threshold adaptation logic coupled to, or included in, the slicer is configured with an expected ratio of received symbols that have values in a certain range, e.g., below the optimal threshold that has shifted from the nominal threshold due to nonlinearity. This optimal threshold is to be discovered as the adapted threshold. The expected ratio can be determined based on an expected statistic distribution of data symbols across the multiple constellations. A first ratio and a second ratio are defined based on the expected ratio, the first ratio equal to the expected ratio minus an error ratio and the second ratio equal to the expected ratio plus the error ratio. The threshold adaptation logic then determines a first value that can make the received symbols in a first range (e.g., below the first value) to constitute the first ratio of a set of slicer inputs, and determine a second value that can make the received symbols in the second range (e.g., below the second value) to constitute the second ratio of a set of slicer outputs. The adapted threshold is then obtained based on the first and the second value.

Embodiments of the present disclosure also provide a constellation adaptation mechanism of determining adapted constellations of a slicer at a receiver based on statistic distributions of the data symbols across the multiple constellations. More specifically, to determine an optimal constellation that offsets from the nominal constellation, constellation adaptation logic is provided with an expected ratio of received symbols that have values in a certain range, e.g., below the optimal constellation value that has shifted from the nominal value due to nonlinearity. This optimal constellation is to be discovered as the adapted constellation. The expected ratio can be determined based on an expected statistic distribution of the slicer inputs across the multiple constellations. The constellation adaption logic compares a first value with a set of received symbols and keeps count of the symbols in the certain range that is defined by the first value (e.g., below the first value) based on the comparison results. The count ratio of the number of inputs in the first range to the total number of the set of inputs is also derived. The first value is adjusted until the ratio reaches the expected ratio. The first value is then designated as an optimal adapted constellation to be used by the slicer.

Embodiments herein are described in detail with reference to 4-level PAM slicers. However, it will be appreciated that the present disclosure is not limited to any particular modulation scheme or any specific number of constellations in a modulation scheme. The constellation adaption and threshold adaptation mechanisms provided herein can be used in any suitable demodulation devices besides slicers.

Statistically speaking, data symbols as modulated and transmitted at the transmitter are distributed across the multiple constellation levels substantially in certain known percentages or ratios. For example, a large number of symbols are distributed substantially evenly across the N nominal constellations as a result of modulation. During signal transmission, the received symbols are altered in an unpredictable fashion because nonlinearity and amplitude compression can cause different noise levels for constellations and different constellation offsets. However, the collective symbol distribution with respect to the multiple constellations is expected to carry over the receiver side despite impairment on the signals during transmission. Particularly, for a large number of received symbols at the receiver, the symbols falling in a particular data range that is defined by the actual constellations or the actual thresholds is expected to constitute a known ratio of the overall received symbols regardless of signal nonlinearity or amplitude compression.

FIG. 1 illustrates exemplary data ranges used to determine optimal adapted thresholds of constellation selection based on an expected statistic distribution of data symbols across multiple constellations in accordance with an embodiment of the present disclosure. Constellation selection may be performed at a slicer. In this example, data symbols are modulated and demodulated according to the PAM-4 scheme, the nominal constellations C(1)~C(4) being [-3, -1, +1, +3] respectively. Accordingly, a slicer uses 3 thresholds TH(1)~TH(3) to decide which constellation is assigned to a received symbol, the nominal thresholds being [-2, 0, +2] respectively.

As dictated by the modulation process at the transmitter side, the data symbols are distributed across the 4 constellations evenly. Accordingly, the data symbols falling below the optimal adapted TH(1) should all be associated with the constellation C(1) and are expected to constitute 25% of the overall received symbols. The data symbols falling between the optimal adapted TH(1) and the optimal adapted TH(2) should all be associated with the constellation C(2), and therefore the data symbols falling below the optimal adapted TH(2) are expected to constitute 50% of the overall received symbols. By the same token, the data symbols falling below the optimal adapted TH(3) should constitute 75% of the overall received symbols.

To find an optimal TH(i) (i=1, 2 and 3), two values TH(i)1 and TH(i)2 are first determined based on the definitions that (1) the symbols below TH(i)1 take up $$\left(100 \times \frac{i}{N} - P\right)/100$$

(alternatively expressed as $$\frac{i}{N} - \frac{P}{100})$$

of the overall received symbols, and (2) the symbols below TH(i)2 take up $$\left(100 \times \frac{i}{N} + P\right)/100$$

(alternatively expressed as $$\frac{i}{N} + \frac{P}{100})$$

of the overall received symbols. In this case, N equals 4 and P/100 is a programmable error ratio that is substantially smaller than i/N, e.g., P=5 or less.

As illustrated, with respect to TH(1), TH((1)1 is defined as a value that (25−P) % symbols are below it and TH(1)2 is defined as a value that (25+P) % symbols are below it. With respect to TH(2), TH(2)1) is defined as a value that (50−P) % symbols are below it and TH(2)2 is defined as a value that (50+P) % symbols are below it. With respect to TH(3), TH(3)1 is defined as a value that (75−P) % symbols are below it and TH(3)2 is defined as a value that (75+P) % symbols are below it. TH(i) can then be derived as TH(i)=mean (TH(i)1,TH(i)2). That is, TH(1)=mean (TH(1)1, TH(1)2); TH(2)=mean (TH(2)1, TH(2)2); and TH(3)=mean (TH(3)1, TH(3)2).

It will be appreciated that the present disclosure is not limited to any specific data ranges and the corresponding expected ratios selected for determining adapted thresholds. For example, in some embodiments, an optimal adapted threshold TH(i) can be determined based on the expected ratios of the symbols that are above a first value TH(i)1 and a second value TH(i)2. In some other embodiments, more than two data ranges can be defined and used to generate an optimal adapted threshold. In still some other embodiments, a single data range can be used to find the optimal adapted threshold. For example, 50% of the symbols are expected to be below an optimal adapted threshold TH(2). The error ratio may be set to a lower value if the difference between two thresholds is too high. In some embodiments, different P values may be used for discovering different thresholds.

Figure 2:
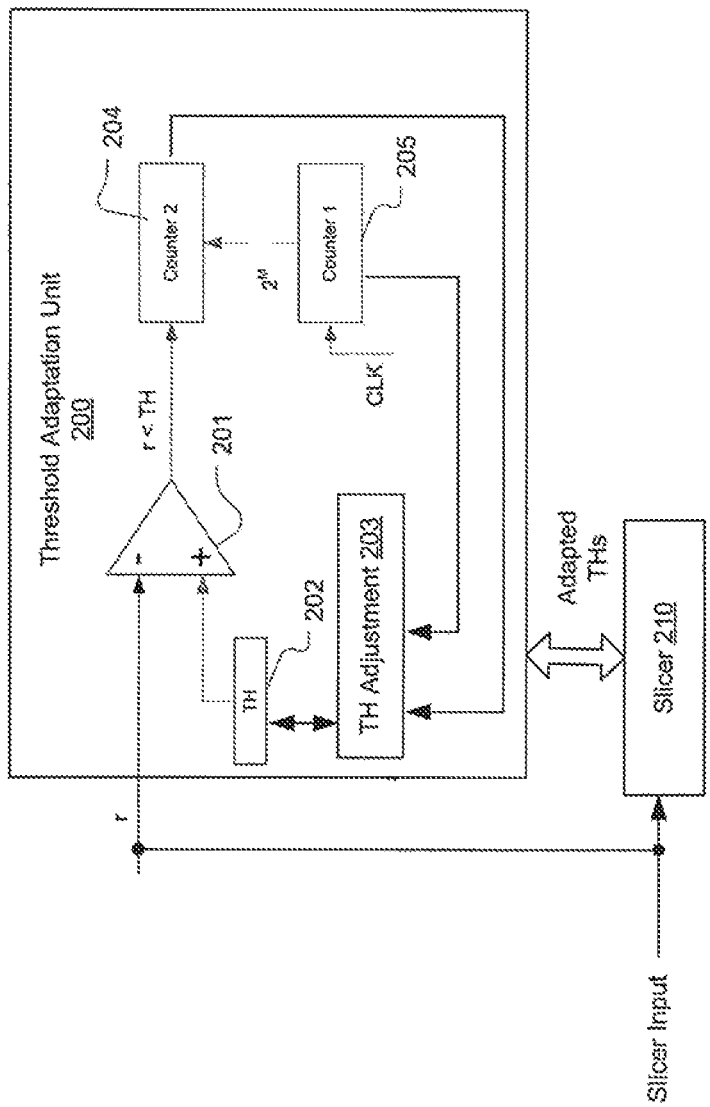
FIG. 2 illustrates the configuration of an exemplary threshold adaptation unit capable of dynamically adapting constellation selection thresholds used in a slicer in accordance with an embodiment of the present disclosure.

FIG. 2 illustrates the configuration of an exemplary threshold adaptation unit 200 capable of dynamically adapting constellation selection thresholds used in a slicer 210 in accordance with an embodiment of the present disclosure. The slicer 210 includes decision circuitry configured to map each input to one of the multiple constellations by comparing the input with the constellation thresholds. For example, each input is a sampled digital data output from an equalizer. The slicer 210 can be implemented in any manner that is well known in the art. The slicer inputs are also fed to the threshold adaptation unit 200 which uses a comparator 201 to compare each input with a "TH" value, e.g., stored in a register. Applied in the example shown in FIG. 1, The TH value is either TH(i)1 or TH(i)2. The threshold adaptation unit 200 includes Counter 1 205 for keeping count of all the inputs subject to comparison with the TH value. Counter 2 204 is coupled to the output of the comparator 201 and keeps count for the inputs that fall in the particular value range defined by the TH based on the comparison results.

Using the example shown in FIG. 1, to discover an optimal adapted threshold TH(l), the TH register 202 is first set to be an initial TH(1)1 value. The total number of inputs to the slicer is programmed to be $2^M$ which can be tracked by the Counter 1 205. Each time the comparator outputs a result indicating that the current input r is smaller than the TH, the Counter 2 204 increments by 1. For each window of $2^M$ inputs, the TH adjustment logic 203 determines the ratio of inputs below TH value by calculating $$\frac{counter\ 2}{counter\ 1}.$$

If the ratio is not equal to the expected ratio (25−P) %, the TH adjustment logic 203 adjusts the TH value accordingly. Another window of $2^M$ inputs are then compared with the new TH value to obtain the ratio of inputs below the new TH by $$\frac{counter\ 2}{counter\ 1}.$$

This process is repeated for multiple windows of $2^M$ inputs until finding a TH value that makes $$\frac{counter\ 2}{counter\ 1} = (25 - P)\%.$$

This TH value is then designated as the TH(1)1. In the same manner, by varying the TH value to obtain $$\frac{counter\ 2}{counter\ 1} = (25 + P)\%,$$

TH(1)2 can be determined. The TH adjustment logic 203 can then generate the optimal adapted TH(1) by averaging the determined TH(1)1 and TH(1)2.

The threshold adaptation unit 200 can be used to sequentially determine the TH(1)1, TH(1)2, TH(2)1, TH(2)2, TH(3)1, TH(3)2, etc. In some other embodiments, the threshold adaptation unit 200 includes duplicate circuits shown in FIG. 2 which can generate different TH(i)X (X=1 or 2) values in parallel. The resultant adapted thresholds are supplied to the slicer for making constellation selection decisions accordingly for the subsequent inputs. The threshold adaptation process may be performed periodically as well as based on needs.

The TH adjustment logic 203 may be implemented in software, firmware, hardware or a combination thereof. The counters 204 and 205 may have a resolution of 32 bits for instance. For a bit-error rate of $10^{-6}$, the number of sampled inputs of one symbol that yields on sample at the threshold is $4 \times 10^6$. For 100 samples at the threshold, the total number of samples is $100 \times 4 \times 10^6$, which is equivalent to 29 bits.

In accordance with embodiments of the present disclosure, a set of optimal adapted thresholds for use of constellation selection can be dynamically determined and adapted to signal non-linearity and amplitude compression in a statistical approach. As a result, data demodulation and data recovery can be advantageously performed with reduced error rates at the receiver. Further, the threshold adaptation does not involve computationally intensive calculations and can be implemented by using simple circuitry, e.g., including a comparator and counters. Thus, design and development costs and operational power consumption can be advantageously reduced, compared with the conventional approaches.

Figure 3A:
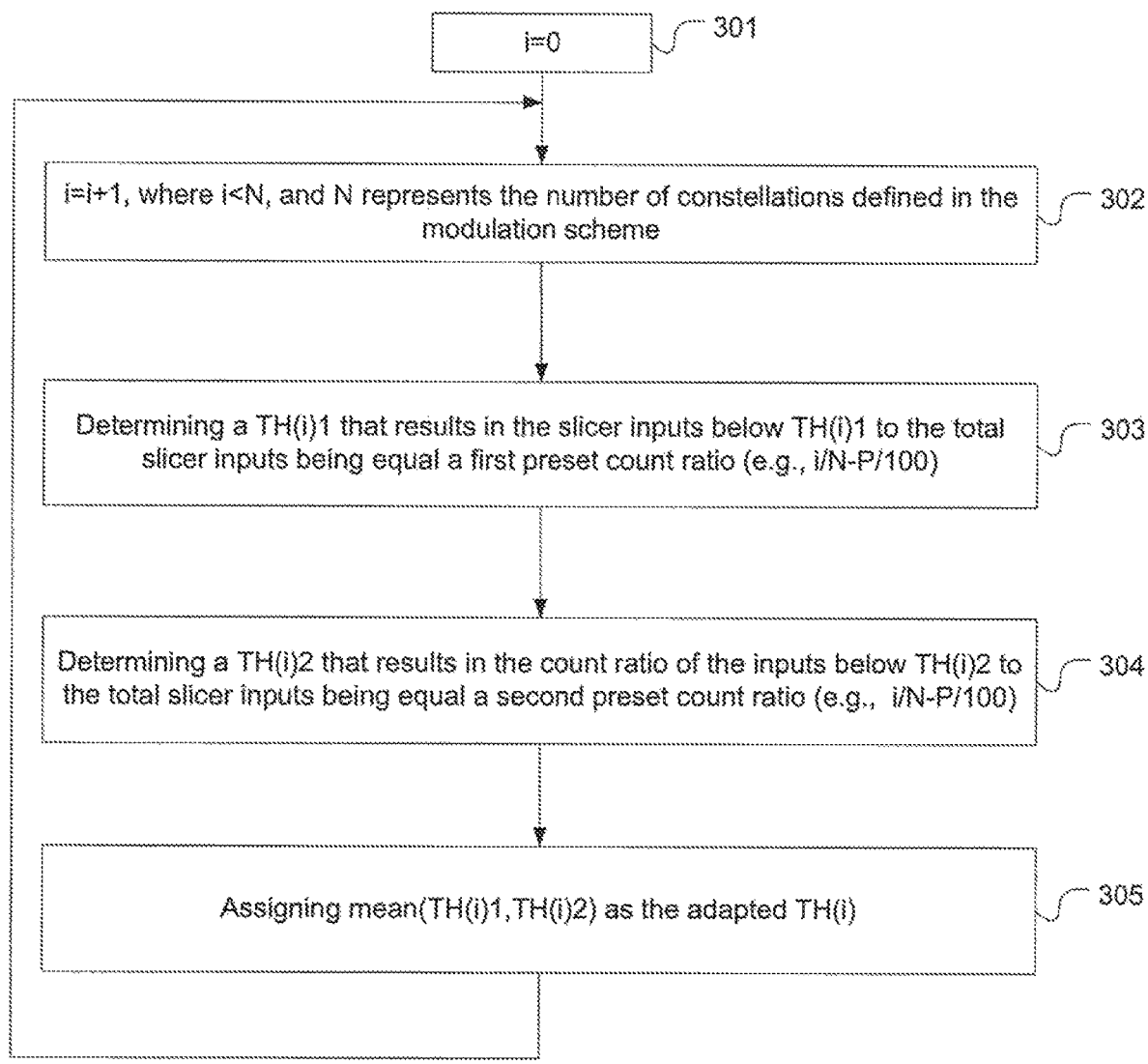
FIG. 3A is a flow chart depicting an exemplary process of determining adapted thresholds for constellation selection in accordance with an embodiment of the present disclosure.

FIG. 3A is a flow chart depicting an exemplary process 300 of determining adapted thresholds for constellation selection in accordance with an embodiment of the present disclosure. Process 300 may be performed by a threshold adaptation unit coupled to, or included in, a slicer as shown in FIG. 2 for example. At 301, the index of threshold i is initialized, where i<N, and N represents the number of constellations defined in the modulation scheme. Particularly, N is 4 for PAM-4. At 302, I increments to 1. At 303, a first value TH(i)1 associated with TH(i) is determined. TH(i)1 defines a certain data range (e.g., <TH(i)1) and is associated with a first preset count ratio (e.g., $$\frac{i}{N} - \frac{P}{100}).$$

The optimal TH(i)1 is defined as one that causes the inputs falling in the data range to meet the first preset count ratio. For example, for i=3, the data range associated with the first value TH(3)1 encompasses any value smaller than TH(3)1 and the preset count ratio for this range is (75−P) %.

At 304, a second value TH(i)2 associated with TH(i) is determined. TH(i)2 defines another data range (e.g., <TH(i) 2) and is associated with another preset count ratio (e.g., $$\frac{i}{N} + \frac{P}{100}).$$

An optimal TH(i)2 is defined as one that causes the inputs falling in this data range to meet the second preset count ratio. For example, for i=3, the data range associated with the first value TH(3)2 encompasses any value below TH(3)2 and the preset count ratio in this range is (75+P) %. At 305, the average of TH(i) 1 and TH(i)2 is assigned as the optimal adapted TH(i), e.g., TH(i)=mean (TH(i)1,TH(i)2). The process 302~305 is repeated to determine each optimal threshold.

Figure 3B:
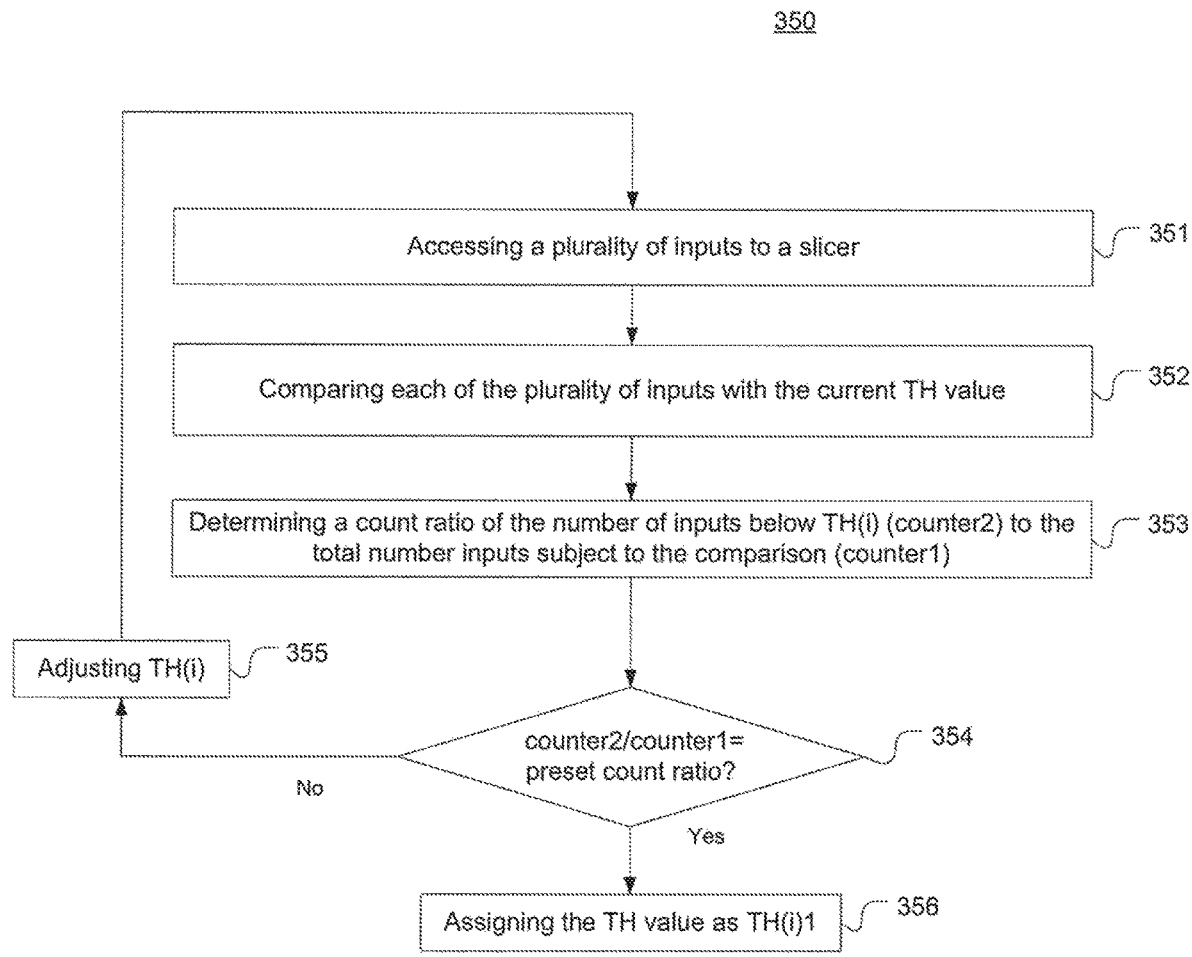
FIG. 3B is a flow chart depicting an exemplary process of determining a first value or a second value associate with a threshold in accordance with an embodiment of the present disclosure

FIG. 3B is a flow chart depicting an exemplary process of determining a first value or a second value TH(i)X (X=1 or 2) associate with a threshold TH(i) in accordance with an embodiment of the present disclosure. At 351, a plurality of inputs of a slicer are accessed. For example, the total number of inputs used for each TH(i)X variation can be preset to a window of $2^M$ inputs. At 352, each of the plurality of inputs is compared with the current TH(i)X value (as set in the TH register 202 in FIG. 2). At 353, the count ratio of the number of inputs below TH(i)X (counter 2) to the total number of inputs subject to the comparison (counter 1) is determined. At 354, it is determined if $$\frac{counter\ 2}{counter\ 1}$$

equals the preset count ratio associated with the TH(i)X. If not, the TH(i)X value is adjusted at 555 and the process 551~554 are repeated for the adjusted TH(i)X value. The process 551~555 is repeated until $$\frac{\text{counter 2}}{\text{counter 1}}$$

equals the preset count ratio. At 556, the final TH(i)X is assigned as the optimal TH(i)X to be used for deriving TH(i).

It will be appreciated that the present disclosure is applicable to various other suitable modulation schemes. For example, for a quadrature amplitude modulation (QAM) with 2N constellations, the same threshold adaptation process shown in FIGS. 3A and 3B can be performed on an individual constellation dimension as well to discover optimal adapted thresholds and adapted constellations. The data ranges shown in FIG. 1 and the associated preset count ratios may also be applied to an individual constellation dimension in a QAM-2N scheme.

Figure 4:
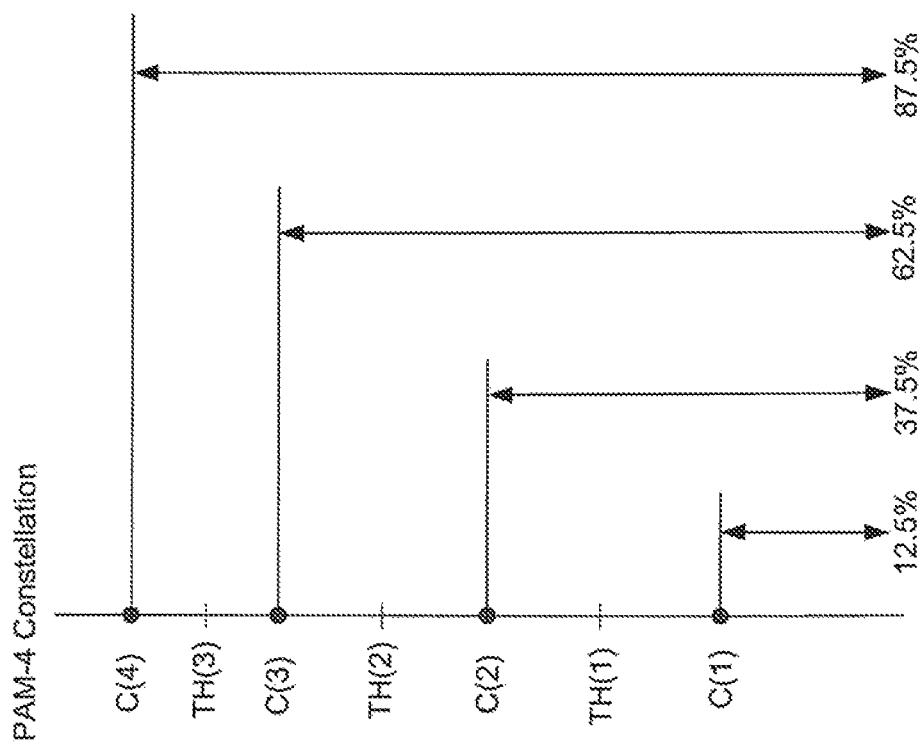
FIG. 4 illustrates exemplary data ranges used to determine optimal adapted constellations based on an expected statistic distribution of data symbols across multiple constellations in accordance with an embodiment of the present disclosure.

According to another aspect of the present disclosure, constellation levels can be dynamically adapted based on the statistic distribution of the received symbols with respect to the multiple constellations. Collectively speaking, the inputs in a certain data range and mapped to a specific constellation are expected to constitute a certain ratio (expected ratio) of the total inputs as dictated by the statistic distribution. FIG. 4 illustrates exemplary data ranges used to determine optimal adapted constellations based on an expected statistic distribution of data symbols across multiple constellations in accordance with an embodiment of the present disclosure. In this example, data symbols are modulated and demodulated according to PAM-4 scheme, the nominal constellations C(1)~C(4) being [−3, −1, +1, +3] respectively. Accordingly, a slicer uses 3 thresholds TH(1)~TH(3) to decide which constellation is assigned to a received symbol, the nominal thresholds being [−2, 0, +2] respectively.

As dictated by the modulation process at the transmitter side, the data symbols are distributed across the 4 constellations evenly. Accordingly, the inputs to the slicer falling below the optimal adapted C(1) are expected to constitute 12.5% (=0+12.5%) of the overall inputs. The inputs falling below the optimal adapted C(2) are expected to constitute 37.5% (=25%+12.5%) of the overall inputs. By the same token, the inputs falling below the optimal adapted C(3) should constitute 62.5% (=50%+12.5%)) of the overall inputs, and the data symbols falling below the optimal adapted C(4) should constitute 87.5% (=75%+12.5%) of the overall inputs. This is equivalent to median of the points that belong to a constellation. There is no assumption of Gaussian noise.

It will be appreciated that the present disclosure is not limited to any specific data ranges and the corresponding expected ratios selected for determining optimal adapted constellations. For example, in some embodiments, an optimal adapted constellation can be determined based on the expected ratios of the symbols that are above the constellation level. In some other embodiments, more than one data ranges can be defined and used to generate an optimal adapted constellation, in a similar manner in the threshold adaptation process described above.

Figure 5:
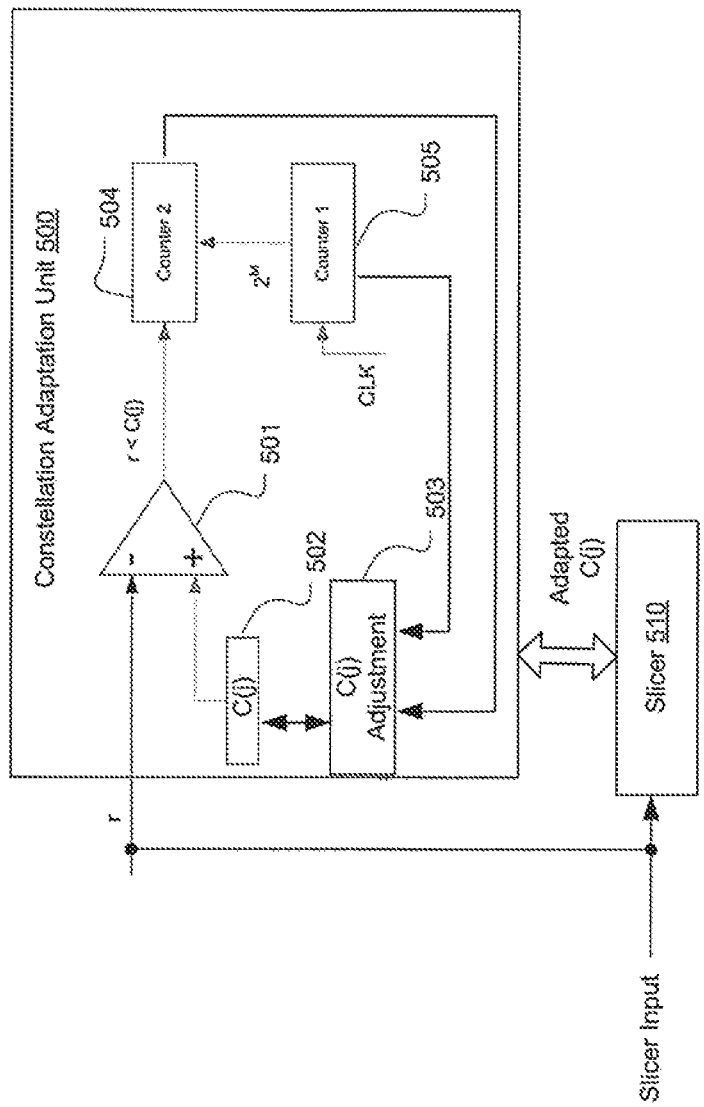
FIG. 5 illustrates the configuration of an exemplary constellation adaptation unit capable of dynamically determining optimal adapted constellations in accordance with an embodiment of the present disclosure.

FIG. 5 illustrates the configuration of an exemplary constellation adaptation unit 500 capable of dynamically determining optimal adapted constellations in accordance with an embodiment of the present disclosure. The slicer 510 includes decision circuitry configured to map each input to one of the multiple constellations by comparing the input with the constellation thresholds. The slicer 510 can be implemented in any manner that is well known in the art. The slicer inputs are also fed to the constellation adaptation unit 500 which uses a comparator 501 to compare each input with a "C(j)" value, e.g., stored in a register 502. The constellation adaptation unit 500 includes Counter 1 505 for keep count of all the inputs used in a constellation adaptation process. The Counter 2 504 is coupled to the output of the comparator 501 and keeps count for the inputs that falls in the particular value range defined by C(j) based on the comparison results.

Using the example shown in FIG. 4, to discover an optimal adapted threshold C(1), the C(j) register is first set to be an initial value. The total number of inputs to the slicer is programmed to be $2^M$ which can be tracked by the Counter 1 505. Each time the comparator outputs a result that the input r is smaller than C(j), the Counter 2 204 increments by 1. For each window of $2^M$ inputs, the C(j) adjustment logic 503 determines the ratio of inputs below C(j) by calculating $$\frac{\text{counter 2}}{\text{counter 1}}.$$

If the ratio is not equal to the expected ratio 12.5%, the C(j) adjustment logic 503 adjusts the C(j) value accordingly. Another window of $2^M$ inputs are then compared with the new C(j) value to obtain the ratio of inputs below the C(j) value in the register 502 based on $$\frac{\text{counter 2}}{\text{counter 1}}.$$

This process is repeated for multiple windows of $2^M$ inputs until finding a C(j) value that results in $$\frac{\text{counter 2}}{\text{counter 1}} = 12.5\%.$$

This C(j) value is then designated as the optimal adapted C(1). By the same token, by varying the C(j) value to obtain $$\frac{\text{counter 2}}{\text{counter 1}} = 37.5\%,$$

C(2) can be determined. The same process is performed to generated the adapted C(3) and C(4) by using preset count ratios of 62.5% and 87.5%, respectively.

The constellation adaptation unit 500 can be used to sequentially determine the C(1)~C(4). The constellation adaption unit 500 can also be used to perform a threshold adaption process as described with reference to FIGS. 1-3B. In some other embodiments, the constellation adaptation unit 500 includes duplicate circuits shown in FIG. 5 which can generate different levels of adapted constellations in parallel. The adapted constellations are supplied to the slicer for making constellation selection decisions accordingly for the subsequent inputs. The constellation adaptation process may be performed periodically as well as based on needs.

The constellation adjustment logic 503 may be implemented in firmware, software, hardware or a combination thereof. The counters may have a resolution of 32 bits for instance. For a bit-error rate of $10^{-6}$, the number of sampled inputs of one symbol that yields on sample at the threshold is 4×10'. For 100 samples at the threshold, the total number of samples is 100×4×10$^6$, which is equivalent to 29 bits.

In some embodiments, to prevent interaction with equalization gain at the receiver, the gain of the 4 optimal constellations can be maintained at a fixed value. For example, $$\sum_{j=1}^{4} |C(j)| = \text{Constant},$$

where Constant=sum (abs[−3, −1, +1, +3]).

Figure 6:
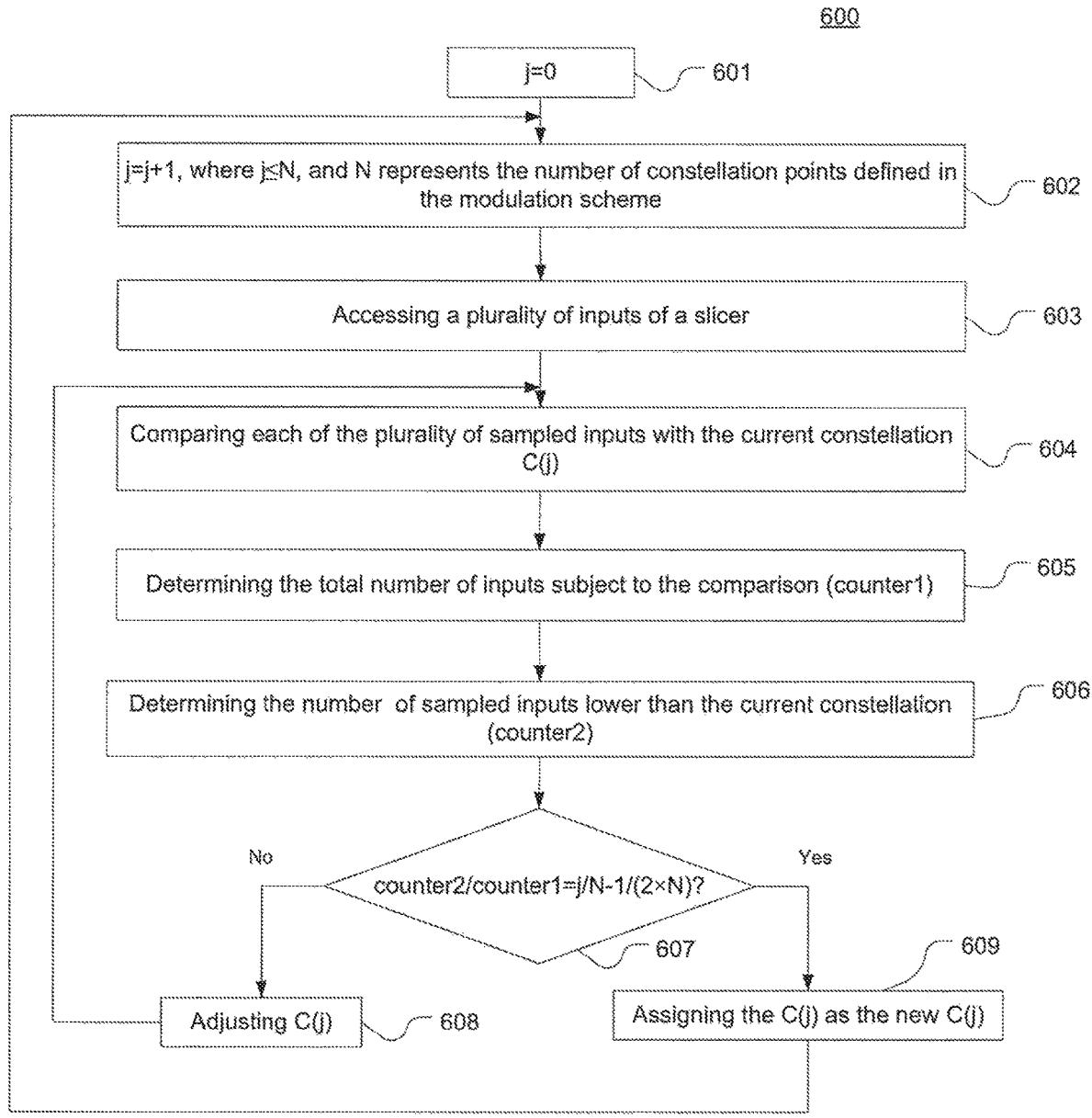
FIG. 6 is a flow chart depicting an exemplary process of determining optimal adapted constellations for demodulation in accordance with an embodiment of the present disclosure.

FIG. 6 is a flow chart depicting an exemplary process 600 of determining optimal adapted constellations for demodulation in accordance with an embodiment of the present disclosure. Process 600 may be performed by a constellation adaptation unit coupled to a slicer as shown in FIG. 5 for example. At 601, the index of constellation j is initialized, where j N, and N represents the number of constellations defined in the modulation scheme. At 602, j increments by 1. At 603, a plurality of inputs of a slicer are accessed. For example, the total number of inputs used for each C(j) variation can be preset to a window of $2^M$ inputs.

At 604, each of the plurality of inputs is compared with the current C(j) value. At 605, a total number of inputs subject to the comparison (counter 1) is determined. At 606, the number of inputs below the current C) value is determined (counter 2). At 606, it is determined if $$\frac{\text{counter 2}}{\text{counter 1}}$$

equals the preset count ratio associated with the C(j), which is $$\left(\frac{j}{N} - \frac{1}{2N}\right).$$

If not, the C(j) value is adjusted at 608, and the foregoing 602~607 are repeated for the adjusted C(j) value. The foregoing 602~608 is repeated until $$\frac{\text{counter 2}}{\text{counter 1}}$$

equals the preset count ratio $$\left(\frac{j}{N} - \frac{1}{2N}\right).$$

At 609, the final C(j) value is assigned as the optimal adapted constellation C(j) which is supplied to the slicer for use.

Figure 7:
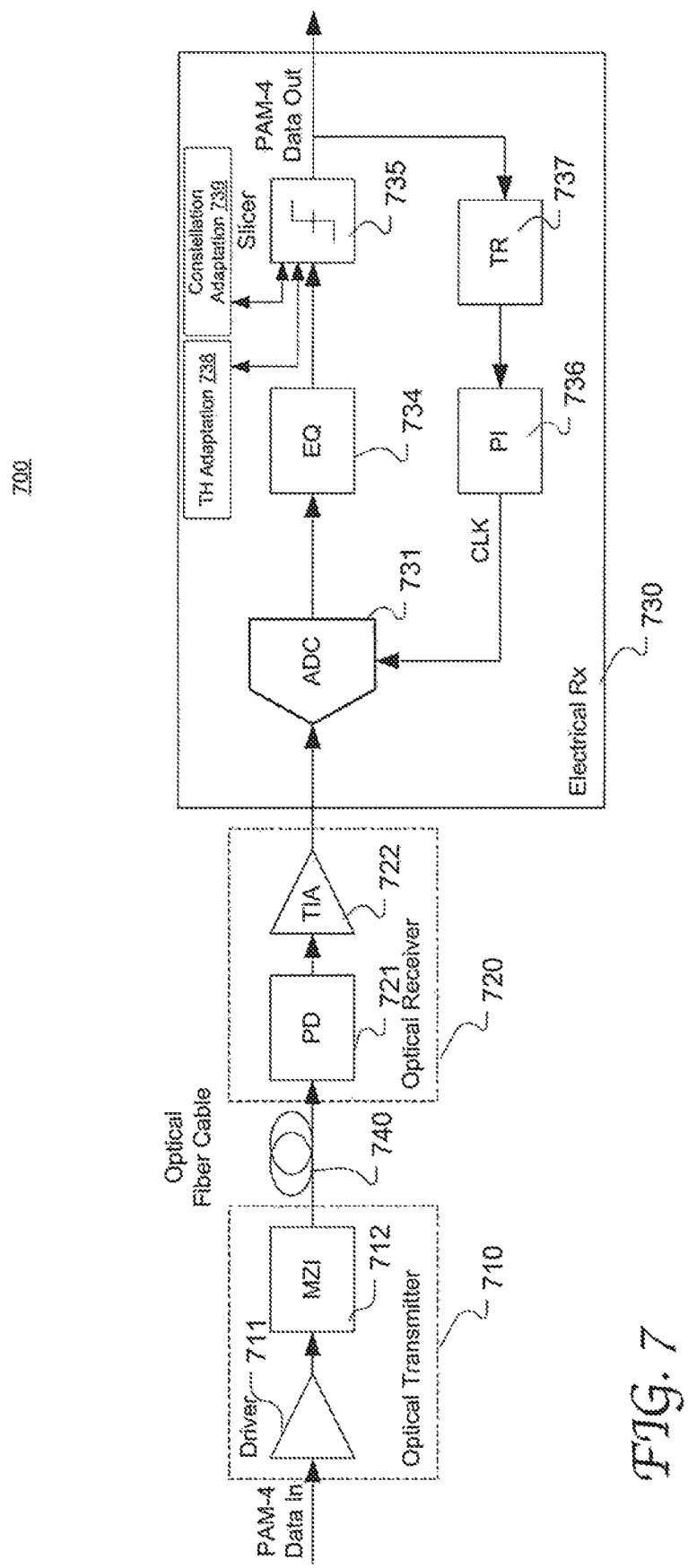
FIG. 7 illustrates a network signal transmission system that includes constellation adaptation logic and constellation selection threshold adaptation logic at the receiver in accordance with an embodiment of the present disclosure.

FIG. 7 illustrates a network signal transmission system 700 that includes constellation adaptation logic 739 and constellation selection threshold adaptation logic 738 at the receiver 730 in accordance with an embodiment of the present disclosure. In a simplified form, the system 700 includes an optical transmitter 710, an optical fiber cable 740, an optical receiver 720 and an electrical receiver 730. The optical transmitter 710 has a driver 711 and a Mach-Zehnder interferometer (MZI) 712 and operates to receive data modulated according to PAM-4. The modulated data is sent for transportation through the optical fiber cable 740. The optical receiver 720 has a photodetector (PD) 721 and a transimpedance amplifier (TIA) 722 and operates to receive data from the optical fiber cable 740. The electrical receiver 730 receives the signals from the optical receiver 720 and performs data and clock recovery. The electrical receiver 730 includes an analog-to-digital converter (ADC) 731, an equalizer 734, a slicer 735, a timing recovery (TR) system 737 and a phase interpolator 736. The slicer 735 is coupled to, or integrates, the threshold adaptation logic 739 and the constellation adaptation logic 739 that can generate optimal adapted thresholds and optimal adapted constellations that vary over time due to nonlinearity or other signal distortions. The threshold adaptation logic 738 and constellation adaptation logic 739 can be used in any other suitable signal transmission and processing systems. In some embodiments, a single circuit as shown in FIG. 2 or 5 can be implemented to perform both the threshold adaptation and constellation adaptation using different configurations of data ranges, TH/C(j) values and the expected count ratios.

Figure 8:
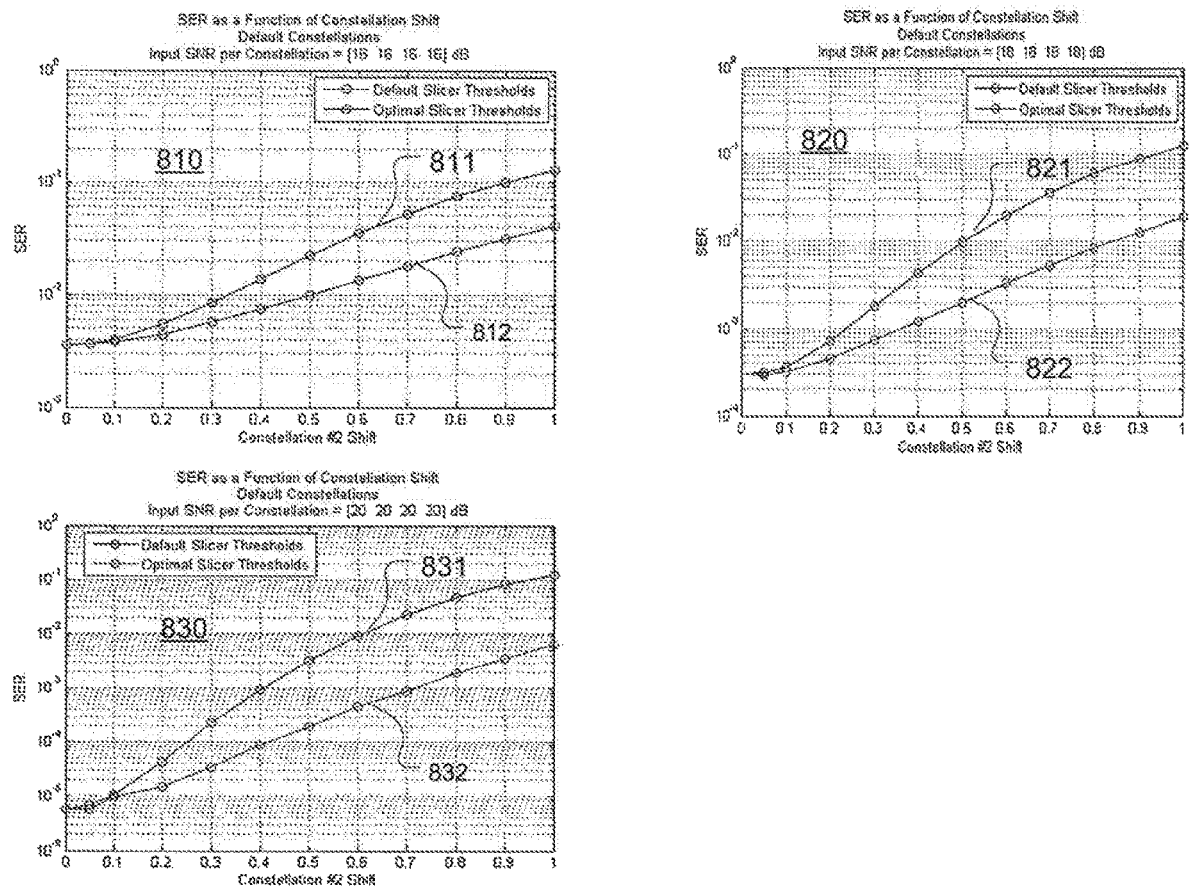
FIG. 8 shows a set of simulated results comparing the symbol error rates (SERs) resulting from using default slicer thresholds and the SERs resulting from optimal adapted thresholds obtained in accordance with an embodiment of the present disclosure.

FIG. 8 shows a set of simulated results comparing the symbol error rates (SERs) resulting from using default slicer thresholds and the SERs resulting from optimal adapted thresholds obtained in accordance with an embodiment of the present disclosure. The data presented in diagrams 810, 820 and 830 are obtained using different input Signal-Noise-Ratio (SNRs) of constellations in PAM-4. In each plot, the SNRs for all 4 constellations are identical, 16 dB in 810, 18 dB in 820 and 20 dB in 830. Each data plot shows SER variation as a function of the amount of constellation #2 shift by using the default slicer thresholds (811, 821 and 831) and by using the optimal adapted thresholds (812, 822 and 832). Comparing the two curves in each plot, it demonstrates that using the optimal adapted thresholds can significantly reduce SER, and the amount of SER reduction increases with constellation shift.

Figure 9:
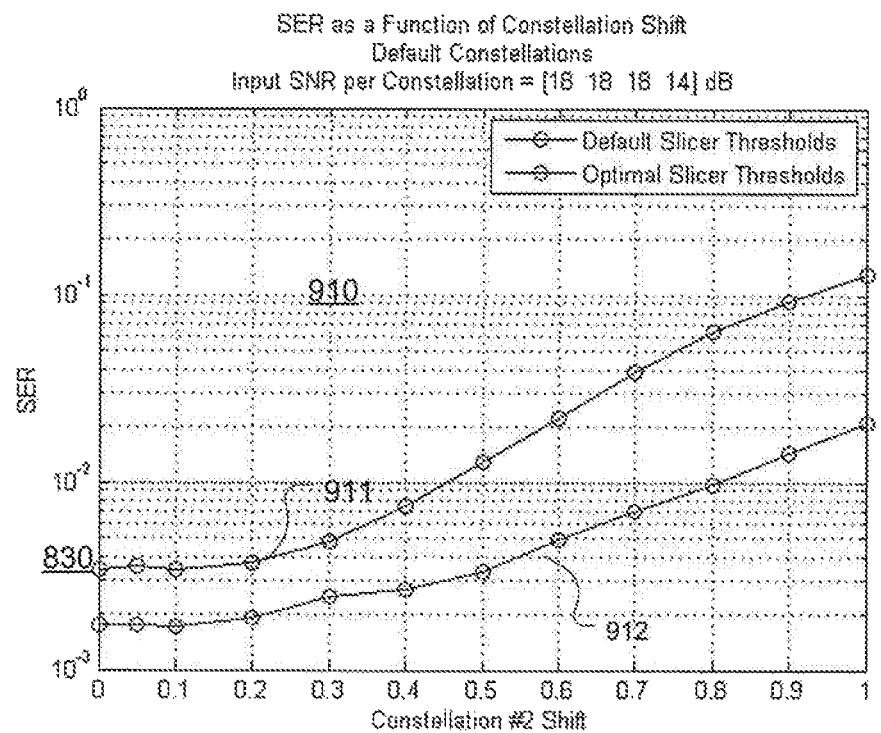
FIG. 9 shows another set of simulated results comparing the SERs resulting from default slicer thresholds and SERs resulting from the optimal adapted thresholds obtained in accordance with an embodiment of the present disclosure.
Figure 9:
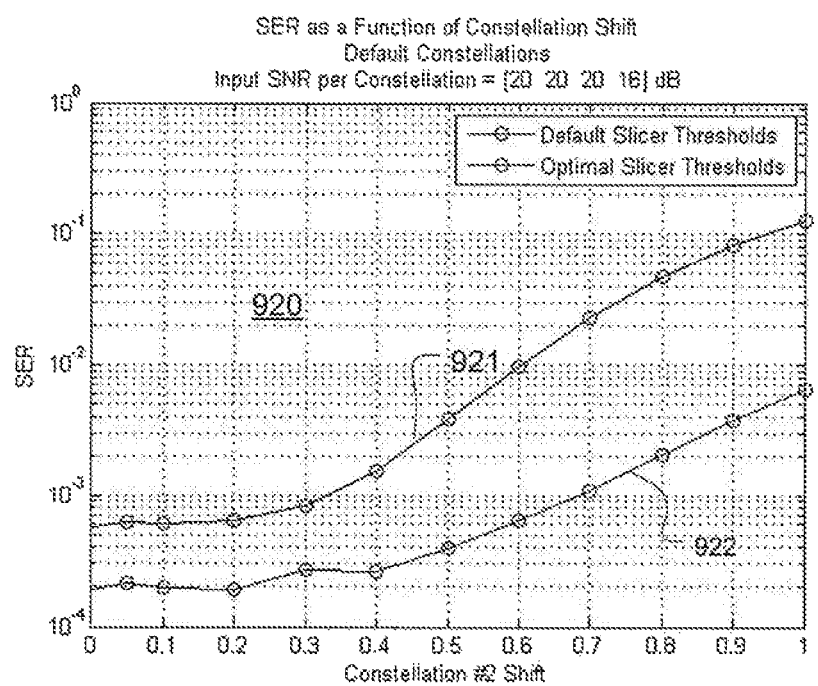

FIG. 9 shows another set of simulated results comparing the symbol error rates (SERs) resulting from default slicer thresholds and SERs resulting from the optimal adapted thresholds obtained in accordance with an embodiment of the present disclosure. The data presented in diagrams 910 and 920 are obtained using different sets of input SNRs of constellations in PAM-4. For plot 910, the input SNRs for the 4 constellations are [18, 18, 18, 14] dB. For plot 920, the input SNRs for the 4 constellations are [20, 20, 20, 16] dB. Each data plot shows SER variation as a function of constellation #2 shift by using the default slicer thresholds (911 and 921) and by using the optimal adapted thresholds (912 and 922). Comparing the two curves in each plot, it demonstrates that using the optimal adapted thresholds can significantly reduce SER, and the SER reduction effect increases with constellation shift.

What is claimed is:

1. A method of dynamically determining adapted constellations for constellation selection in demodulation, the method comprising:

accessing a first plurality of sampled inputs to a slicer and that are generated in response to a signal received at a receiver;

comparing each of said first plurality of sampled inputs with a first value;

based on said comparing with said first value, determining a first count ratio that represents a ratio of first sampled inputs to said first plurality of sampled inputs, wherein each of said first sampled inputs is comprised in said first plurality of sampled inputs and has a value encompassed in a first range that is defined by said first value;

comparing said first count ratio with a preset count ratio;

determining an adapted constellation based on said first value, and said comparing with said preset count ratio; and selecting said adapted constellation as an output in response to a sampled input based on one or more constellation selection thresholds.

2. The method of claim 1 further comprising adjusting said first value until said first count ratio equals said preset count ratio.

3. The method of claim 1, wherein said adapted constellation equals said first value if said first value results in said first count ratio equal to said preset count ratio.

4. The method of claim 1, wherein said first plurality of sampled inputs are inputs to the slicer configured to use a Pulse Amplitude Modulation (PAM) scheme comprising N constellation levels, wherein said preset count ratio equals $$\frac{j}{N} - \frac{1}{2N},$$

wherein j is an integer greater than 0 and smaller than or equal to N.

5. The method of claim 4, wherein said adapted constellation offsets from a nominal constellation of said PAM scheme used in modulation of said signal at a transmitter.

6. The method of claim 4, wherein said first range encompasses any value smaller than or equal to said first value.

7. The method of claim 1, wherein said first plurality of sampled inputs are inputs to the slicer configured to use Quadrature Amplitude Modulation (QAM) comprising 2×N constellation levels, wherein said preset count ratio equals $$\frac{j}{N} - \frac{1}{2N},$$

where j is an integer greater than 0 and smaller than N.

8. The method of claim 1 further comprising:

performing analog-to-digital conversion on said signal to generate sampled inputs; and performing equalization on said sampled inputs to generate said first plurality of sampled inputs.

9. A device comprising:

a slicer decision unit configured to:
 select a first constellation as an output responsive to an input greater than a threshold; and
 select a second constellation as an output responsive to an input smaller than said threshold; and a constellation adaptation unit coupled to said slicer decision unit comprising:
 a comparator configured to compare each of a first plurality of inputs with a first value, wherein said first plurality of inputs are supplied to said slicer decision unit;
 a first counter configured to, responsive to comparison decisions output from said comparator, produce a number of first inputs comprised in said first plurality of inputs and each having a value encompassed in a first range, wherein said first range is defined by said first value; and
 logic configured to:
  determine a first count ratio of said number of said first inputs to a total number of said first plurality of inputs;
  determine an adapted constellation based on said first value and said first count ratio; and
  send said adapted constellation to said slicer decision unit.

10. The device of claim 9, wherein the first constellation and said second constellation are adapted constellations offset from nominal constellations used in modulation.

11. The device of claim 10, wherein said constellation adaptation unit is further configured to vary said first value until said first count ratio equals a preset count ratio.

12. The device of claim 11, wherein said slicer decision unit is configured to use a Pulse Amplitude Modulation (PAM) scheme comprising N constellation levels, and wherein further
said preset count ratio equals $$\frac{j}{N} - \frac{1}{2N},$$

wherein i is an integer greater than 0 and smaller than or equal to N.

13. The device of claim 11, wherein said slicer decision unit is configured to use Quadrature Amplitude Modulation (QAM) comprising 2×N constellation levels, and wherein further
said preset count ratio equals $$\frac{j}{N} - \frac{1}{2N},$$

wherein j is an integer greater than 0 and smaller than or equal to N.

14. The device of claim 9, wherein said first range encompasses any value below said first value.

15. A receiver comprising:

an analog-to-digital converter (ADC) configured to converted received analog signals to digital signals;

an equalizer coupled to said ADC and configured to:
 generate equalized signals responsive to digital signals; and send said equalized signals as inputs to a slicer decision unit;

said slicer decision unit coupled to said equalizer and configured to:
 select a first constellation as an output responsive to an input greater than a threshold; and
 select a second constellation as an output responsive to an input smaller than said threshold; and a constellation adaptation unit coupled to said slicer decision unit and configured to:
 access a first plurality of inputs;
 compare each of said first plurality of inputs with a first value;
 based on said comparing with said first value, determine a first count ratio of first inputs to said first plurality of inputs, wherein each of said first inputs is comprised in said first plurality of inputs and has a value encompassed in a first range that is defined by said first value;

compare said first count ratio with a preset count ratio;

determine an adapted constellation based on said first value and said comparing with said preset count ratio.

16. The receiver of claim 15, wherein said constellation adaptation unit is further configured to determine said first value by adjusting said first value until said first count ratio equals said preset count ratio.

17. The receiver of claim 15, wherein said slicer decision unit is configured to use one of: Pulse Amplitude Modulation (PAM) comprising N constellation levels; and Quadrature Amplitude Modulation (QAM) comprising 2×N constellation levels.

18. The receiver of claim 15, wherein said first range encompasses any value below said first value, and wherein said second range encompasses any value below said second value.

19. The receiver of claim 15, wherein said first constellation and said second constellation are adapted constellations determined by said constellation adaptation unit.

* * * * *